Figure 1:
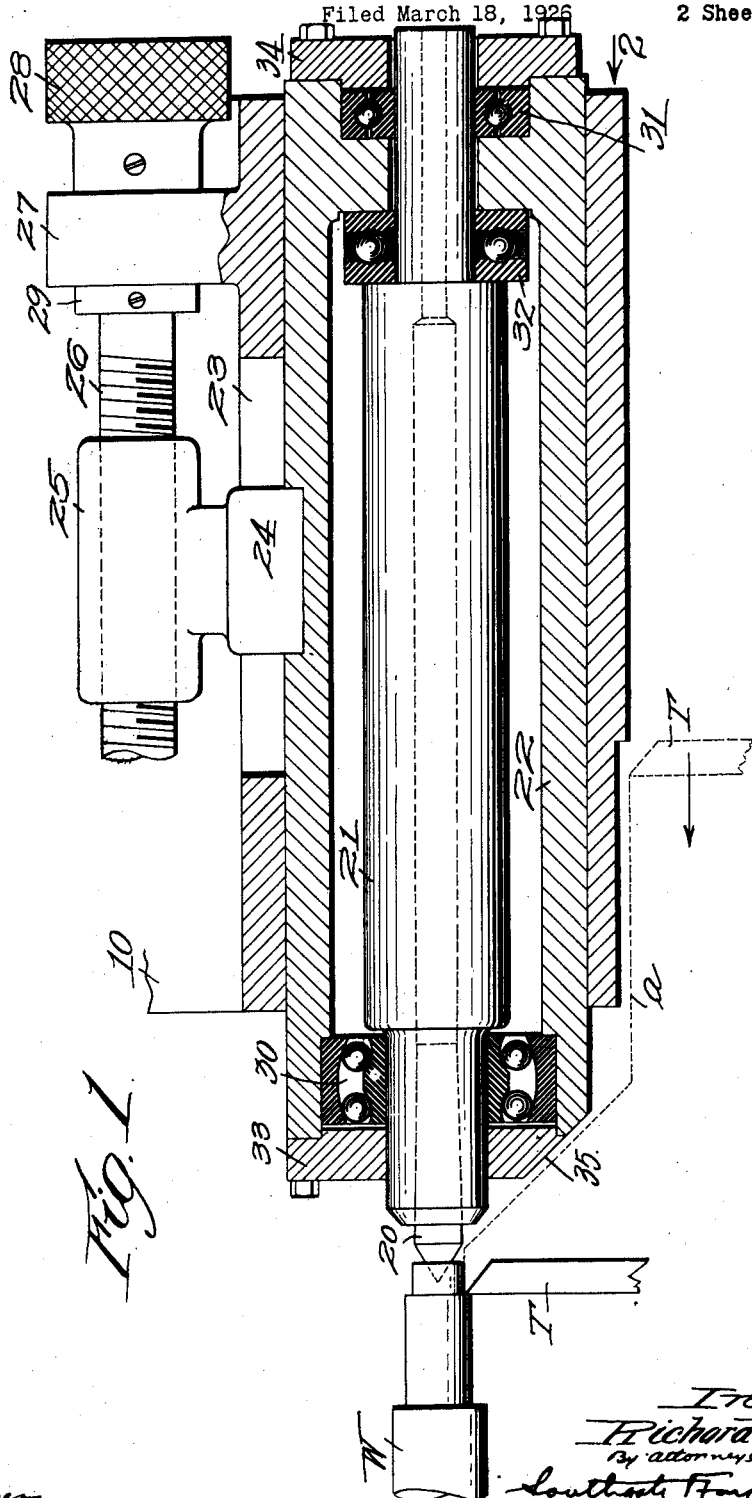

Oct. 30, 1928.

R. A. ASHTON 1,689,709

TAIL STOCK FOR LATHES

Filed March 18, 1926

2 Sheets-Sheet 1

Inventor
Richard A. Ashton
By attorneys
Southgate Faye & Howley

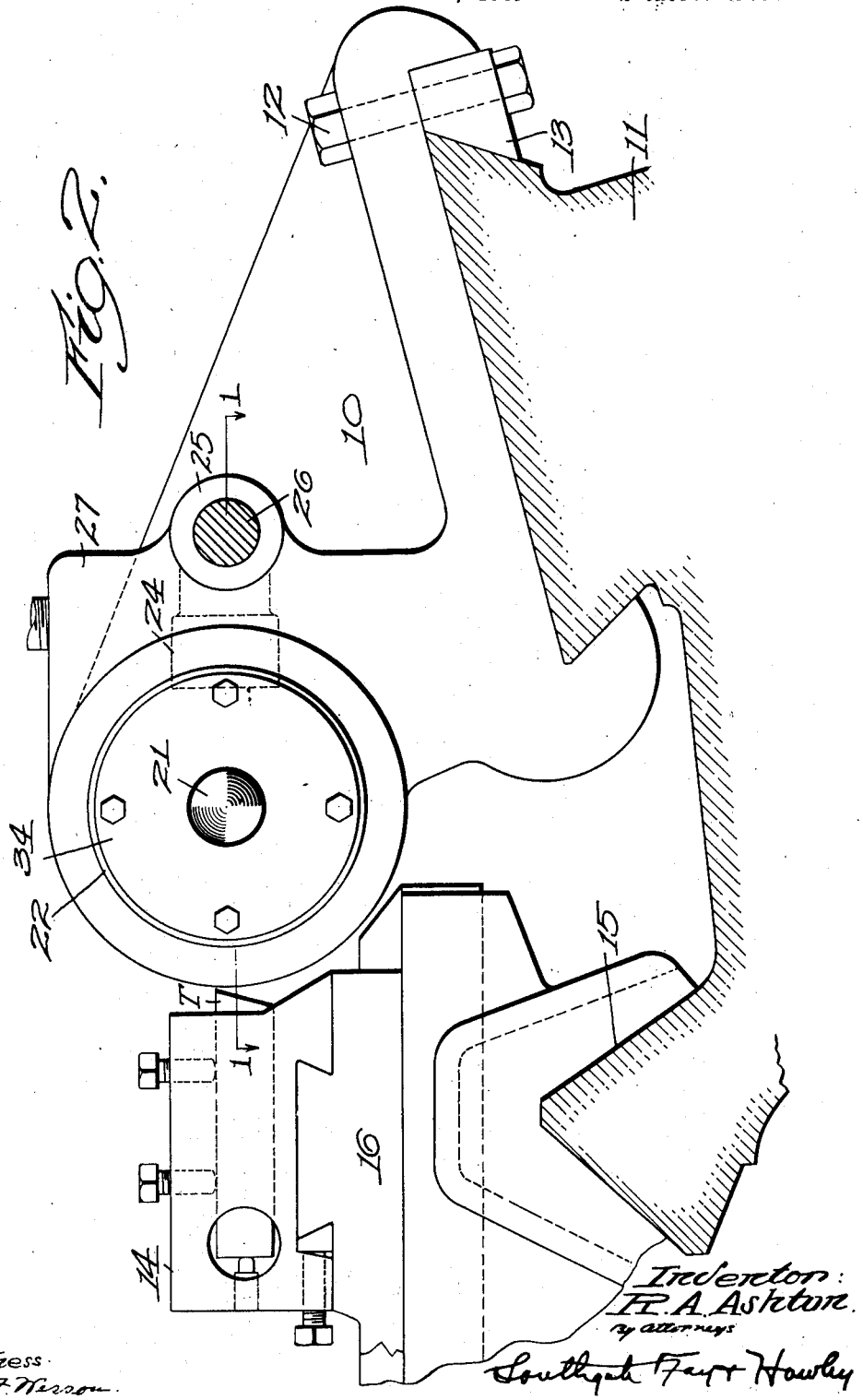

Patented Oct. 30, 1928.

1,689,709

UNITED STATES PATENT OFFICE.

RICHARD A. ASHTON, OF SENECA FALLS, NEW YORK, ASSIGNOR TO SENECA FALLS MACHINE CO., OF SENECA FALLS, NEW YORK, A CORPORATION OF MASSACHUSETTS.

TAILSTOCK FOR LATHES.

Application filed March 18, 1926. Serial No. 95,776.

This invention relates to a tail stock adapted for use on a grinding machine, a screw machine, or other machine tool, but particularly designed for use on a lathe.

It is the object of my present invention to provide a tail stock so constructed that the tail center may be freely rotatable while at the same time it firmly and accurately supports and positions the work.

A further object of my invention is to provide an improved bearing structure for a rotatable tail center and particularly to provide a rotary spindle to receive the tail center, a support or sleeve in which the spindle is rotatable mounted, and means to adjust the support or sleeve axially in the tail stock frame.

My invention also relates to the provision of improved bearings for the spindle, insuring perfect freedom of rotation and also effectively resisting end thrust on the tail center and spindle.

I also provide a specific construction by which advance of the cutting or turning tool to working position is much facilitated.

My invention further relates to improvements and combinations of parts which will be hereinafter described and more particularly pointed out in the appended claims.

A preferred form of my invention is shown in the drawings, in which,

Fig. 1 is a sectional plan view of my improved tail stock taken along the line 1—1 in Fig. 2;—and Fig. 2 is an end elevation thereof, looking in the direction of the arrow 2 in Fig. 1.

Referring to the drawings, I have shown a tail stock 10 adapted to be clamped to a base or frame 11 by binding bolts 12 and a plate or gib 13.

A lathe tool T is mounted on a tool carriage 14 which is slidable along a guideway 15 at the front of the frame 11. The tool slide 16 is also transversely adjustable towards and from the work in the usual manner.

The tail center 20 is secured in a tapered recess in one end of a spindle 21 having the usual axial opening used to permit a guide rod to be inserted therein to displace the tail center when desired.

The spindle 21 is rotatably mounted in a sleeve or cylinder 22, which is slidable axially in the tail stock 10, the tail stock being provided with a cylindrical recess to receive the sleeve 22. One side wall of the cylindrical portion of the tail stock is provided with an axially extended slot 23 through which projects a portion 24 of the sleeve, said portion fitting closely between the sides of the slots. The outer end of the projecting portion 24 is provided with a threaded head or nut 25 to receive a threaded adjusting screw 26 mounted in a bearing 27 on the tail stock 10 and held from axial movement by a hand wheel 28 and a collar 29. Rotation of the screw 26 causes axial movement of the sleeve 22, while at the same time the projecting portion 24 of the sleeve prevents angular movement of the sleeve.

The spindle 21 is preferably provided with removable anti-friction bearing raceways 30 and 31 at the opposite ends of the spindle, by which bearings the spindle is supported for free rotation in the sleeve 22. An end thrust bearing 32 is provided to support the end thrust on the spindle as the center is forced against the work W. This end thrust bearing is also preferably of the anti-friction type. In certain cases, however, the thrust bearing 32 may be omitted, as the bearings 30 and 31 are well adapted to resist a certain amount of axial pressure.

The cylinder 22 is provided with a removable cap 33 which permits the bearing 30 to be conveniently inserted and a cap 34 at the opposite end of the sleeve 22 holds the bearing 31 in position. The front end portion of the sleeve 22 and of the head or cap 33 are preferably cut away or beveled at an angle of approximately 45° as indicated at 35 in Fig. 1. This permits the lathe tool T to be advanced along the path indicated by the dotted line $a$ in Fig. 1, so as to engage the end of the work W. This angular advance movement of the tool as it is at the same time moved axially is found to greatly facilitate the starting of operations upon the work and constitutes an important feature of my invention.

Having thus described my invention, it will be seen that I have provided a tailstock construction in which the tail center is supported for free rotation and is also held from axial movement by the specially provided thrust bearing. I have also provided a construction by which the center and spin- dle may be conveniently adjusted axially and have provided for making an angular advance movement of the tool along a line at approximately a 45° angle to a position at the end of the work W.

The construction shown and described facilitates the operation of the lathe and the production of the machine is increased.

Having thus described my invention, I do not wish to be limited to the details hereinafter disclosed otherwise than as set forth in the claims, but what I claim is:—

1. In a tail stock, a frame, a sleeve slidable axially therein, a spindle freely rotatable in said sleeve, and a center supported by said spindle, removable anti-friction bearing raceways mounted in said sleeve for said spindle at both ends thereof and also an additional removable thrust bearing raceway mounted in said sleeve for resisting axial pressure on said spindle.

2. In a tail stock, a frame, a sleeve slidable axially therein, a spindle freely rotatable in said sleeve, a center supported by said spindle, said sleeve having mounted therein removable anti-friction bearing raceways for said spindle and having also mounted therein a removable anti-friction thrust bearing resisting axial pressure on said spindle and center.

3. In a tail stock, a frame having a cylindrical opening therein and having an axially extended slot in one wall of said opening, a sleeve slidable in said opening and having a projection extending outwardly through said slot and slidably fitting therein, and an adjusting device mounted on said frame, said projection preventing angular movement of said sleeve in said frame and having a threaded connection with said adjusting device and being axially adjustable thereby.

4. In a tail stock, a frame, a sleeve slidable axially therein, and held from rotation relatively thereto, and a tail center mounted for free rotation therein, anti-friction bearings for said center, said sleeve having an end portion thereof cut away, at one side and adjacent one bearing, to permit advance movement of a tool toward working position at the adjacent end of the work along a path inclined toward the axis of the tail center at substantially 45 degrees.

In testimony whereof I have hereunto affixed my signature.

RICHARD A. ASHTON.